United States Patent Office 3,133,861
Patented May 19, 1964

3,133,861
ATTENUATED LIVE MEASLES VIRUS VACCINE AND METHOD OF PRODUCTION
Anton J. F. Schwarz, Indianapolis, Ind., assignor to The Dow Chemical Company, Midland, Mich., a corporation of Delaware
No Drawing. Filed Nov. 8, 1961, Ser. No. 150,896
12 Claims. (Cl. 167—78)

This invention is concerned with an attenuated measles virus vaccine and with a method for the preparation thereof, and is particularly directed to the preparation of such a vaccine which has been attenuated as regards severity of human reaction without loss of antigenicity.

The term "attenuated virus" as employed herein refers to a virus of which the virulence has been altered by the method of culture so that it does not produce severe symptoms when inoculated into non-immune humans although retaining its antigenicity, that is, its ability to stimulate production of antibodies.

Virulent measles virus has previously been cultured in tissue culture on various substrates and has been adapted to multiply in chick embryo tissue. In particular, Enders and his co-workers (Enders, Katz, Medearis "Recent Advances in Knowledge of Measle Virus" in Perspectives in Virology, New York, John Wiley, 1959; Katz, Milovanovic and Enders, Proceedings of the Society for Experimental Biology and Medicine, vol. 97, pp. 23–29, 1958) have propagated the Edmonston strain of measles virus in a series of passages successively through human kidney tissue culture, human amnion tissue culture, embryonated eggs and chick embryo tissue culture. Such culture methods employed in the past have, in general, incubated the culture medium, after inoculation with virus, at temperatures in the range of 35° to 37° C. The resulting cultured virus is partially modified; however, on inoculation into non-immune humans, such virus has been found to produce relatively severe undesirable reactions such as high fevers in a large proportion of those inoculated. Such partially modified virus has also produced rash in a large proportion of children inoculated therewith. Thus, such virus has not been generally recommended for use in the vaccination of children, except when accompanied by an injection of gamma globulin to protect the child from the severe symptoms. Such a two-stage method of vaccination is unwieldy and expensive.

Recently, Schwarz et al., (Journal of the American Medical Association, vol. 173, pp. 861–867, 1960) reported the preparation and testing of virus pools wherein the Edmonston strain of measules virus, which enders and his co-workers had propagated successively 24 times in human kidney tissue culture, 28 times in human aminon tissue culture, 6 times in embryonated eggs and 13 times in chick embryo tissue culture, was carried through four additional passages in chick embryo tissue culture. The resulting virus was used in experimental vaccination against measles during an epidemic in Panama, as reported by Hoekenga et al., (Journal of the American Medical Association, vol. 173, pp. 868–872, 1960). This partially-modified live measles virus vaccine proved to be effective in immunization, but still had the disadvantage of causing undesirable reactions; for example, 70 to 80 percent of the children under five years of age who were inoculated had some degree of fever, and in some instances, the rectal temperature reached 105° F. Further, about 50 percent of the children developed a rash following the inoculation. It is apparent that it would be desirable to have available an attenuated virus vaccine for measles capable of stimulating antibody response to produce effective immunization against the disease without significant undesirable reactions.

It is an object of the present invention to provide a novel, attenuated, live measles virus vaccine. It is a further object to provide a method for attenuating the virus and for the preparation of such vaccine. Other objects will become apparent from the following specification and claims.

In accordance with the present invention, it has been discovered that the cultivation of measles virus in non-human animal tissue culture at below-normal temperatures, that is, at a temperature below 35° C., preferably at from about 28° to about 32° C., produces an attenuated virus of high antigenicity which, however, has been so attenuated as to produce little or no undesirable reaction in children inoculated therewith.

In one mode of carrying out the invention, tissue cultures of non-human animal tissue are established in conventional fashion in a nutrient fluid, which is nontoxic to measles virus and which supports the growth of such tissue, and inoculated with live measles virus. The inoculated tissue cultures are then incubated at 35°–37° C. for a period of time and the virus passed in serial passages on the same animal tissue for a sufficient number of passages to assure adaption of the virus to growth on the particular tissue employed. In this fashion, it has been shown, for example, that measles virus can be adapted to growth on canine kidney tissue, bovine kidney tissue, porcine kidney tissue and chick embryo tissue. Following the foregoing adaptive culture, the virus is then passed serially in tissue culture, on the particular substate to which it has been adapted, with incubation of the virus carried out at below-normal temperatures of from about 28° to about 32° C. to accomplish modification of the virus, whereby the modified virus, when injected into children who are not immune to measles, is capable of stimulating the production of protective measles antibodies without producing appreciable rash, high fever or other usual pathological symptoms of measles. The foregoing method of culturing measles virus, when carried out on avian tissues, particularly chick embryo tissues, represents a preferred embodiment of the invention.

In a further method of carrying out the invention, the initial live measles virus is inoculated into established animal tissue culture and incubated at below-normal temperatures, as set forth above, without prior adaptation to the particular tissue at normal incubation temperatures. Thereafter, serial transfer and incubation at said below-normal temperatures, preferably from about 28° C. to about 32° C., is continued for a sufficient number of passages to obtain the desired attenuation of the virus.

Alternatively, when fresh native measles virus is employed as the starting material, it is frequently desirable to affect the initial multiplication of the virus in a human tissue culture such as human kidney tissue culture, human amnion tissue culture, or human heart tissue culture, or in an animal tissue known to serve readily as a host tissue for multiplication of such native virus as, for example, in canine kidney tissue culture. In such operations, it may be desirable to continue cultivation on such human or canine tissue for a number of serial passages until the identity and purity of the established virus can be established. Thereafter, adaptation of the virus to other non-human animal tissues and attenuation of said virus by incubation at low temperatures is carried out by the above-described method. In any adaptive steps prior to initiation of the incubation at below-normal temperatures, it will be apparent that intervening transfers to other tissues or to embryonated eggs by conventional techniques may be carried out without departing from the scope and spirit of the present invention.

In one method of operation, the culture of non-human animal tissue is established as set forth above and as soon as good growth of the tissue is evident, the initial charge of nutrient fluid is replaced with fresh nutrient fluid and the cultures are inoculated with live measles virus. During incubation of the virus, mild agitation of the culture vessels as, for example, by a roller drum assembly, may be employed. Alternatively, static culture methods may be used provided care is taken to assure that the tissue cells are immersed in the nutrient fluid. Multiplication of the virus is usually evidenced by a distinctive cytopathogenic effect on the tissue cells which can be observed under the microscope. In some cases, however, particularly in the early stages of adaptation of the virus to a new type of host cells, an observable cytopathogenic effect is evidenced only after a long period of incubation, if at all. In such cases, however, multiplication of the virus can be followed by titrating a portion of the inoculated tissue culture fluid in a culture of human tissue, such as human amnion tissue, human heart tissue or the like, susceptible to said virus. The latter readily shows a typical cytopathogenic effect when infected with measles virus. In the preferred mode of operation, the virus is passed serially through successive fresh animal tissue cultures with incubation at 35° C. for a few, preferably about 10, serial passages to assure adaptation to the particular tissue employed. In any case, further serial passages in such tissue culture are thereafter carried out with incubation of the virus at below-normal temperatures, preferably of from about 28° C. to about 32° C., to accomplish the desired attenuation of the virus. The exact number of serial passages required at the lower temperature will vary depending upon such factors as the particular strain of measles virus employed, the previous cultural history thereof, and the particular tissue used in the tissue culture. In chick embryo tissue culture, good results as regards attenuation have been obtained when employing about 40 serial passages of the virus at an incubation temperature of from 28° to 32° C.

When attenuation of the virus has been obtained in the foregoing manner, the desired attenuated strain of virus can be maintained by tissue culture on the same type of tissue to which the virus has been adapted and with continued incubation at temperatures of 28° to 32° C. In general, it is desirable, but not necessary, to transfer the virus to fresh tissue cultures when from about 20 to 75 percent, preferably from about 25 to 50 percent, of the cells in a given batch of inoculated tissue culture show a cytopathogenic effect.

Similar techniques are employed for multiplying the attenuated virus to obtain pools for vaccine preparation. In the latter operations, the culture is incubated until the virus has multiplied to produce a useful concentration thereof and the fluid from the tissue culture vessels is harvested as by decantation under aseptic conditions and clarified by centrifugation, filtration, or the like. The resulting product may be used directly as a vaccine, or depending on the contained concentration of virus, may be diluted with a suitable injectable diluent or stabilizing solution, nontoxic to the virus, to prepare a finished liquid vaccine. When an appreciable portion of the tissue cells in the culture have not been disintegrated by the cytopathogenic effect of the growth of the virus, fresh fluid, such as a suitable vaccine stabilizer solution, balanced salt solution, fresh nutrient medium or the like, is added to the culture vessels following the above decantation step, and said vessels and contents are carried through a cycle of freezing and thawing to release further virus from the tissue cells. The resulting fluid is harvested and pooled with the previous harvest to provide a vaccine concentrate. The latter is freed of tissue cells and debris in suitable fashion, as set forth above, and the virus content is standardized by titration as, for example, against human tissue culture cells. Thereafter, if desired, the vaccine concentrate may be employed directly for vaccination of non-immune humans or may be diluted with a sterile stabilizer such as lactose-glutamate solution and stored frozen, preferably at a temperature of −20° C. to −70° C., until used. Alternatively, the stabilized vaccine may be freeze-dried to provide a dry vaccine product which is easily storable and which may be reconstituted with sterile water or the like just prior to use.

Although continued incubation at the prescribed below-normal temperatures is preferred for assuring the desired attenuation of the virus with the least number of successive passages, it will be apparent that minor variations may be introduced without departing from the spirit and scope of the invention. Thus, for example, the serial passages at 28°–32° C. can be interrupted by one or a few passages at higher temperatures, provided the total number of passages at the below-normal temperature is sufficient to accomplish the desired attenuation. Similarly, after the desired attenuation has been achieved, one or two multiplication passages for propagation of the vaccine pool can be carried out at suitable higher temperatures, if desired.

The following examples illustrate the invention and set forth the best mode contemplated for carrying out said invention, but are not to be construed as limiting the same.

EXAMPLE 1

*Tissue Culture Technique*

Eight to ten day old chick embryos were finely chopped under aspectic conditions, after removal of the eyes, and the resulting minced tissue washed with phosphate-buffered saline solution. The washed tissue was trypsinized in conventional fashion in an Erlenmeyer flask agitated with a magnetic stirrer. The trypsinized tissue was centrifuged at 1000 r.p.m. for three minutes and the resulting concentrated cells were suspended in growth medium to provide 500,000 to 600,000 cells per milliliter. The growth medium consisted of Earle's basic salt solution (sodium chloride 6.8 g., potassium chloride 0.4 g., calcium chloride 0.2 g., magnesium sulfate heptahydrate 0.2 g., sodium acid phosphate 0.125 g., glucose 1.0 g., sodium bicarbonate 2.2 g. and phenol red 0.02 g. dissolved in water to make 1000 milliliters) containing 5 percent calf serum and 0.5 percent lactalbumin hydrolysate and further containing 200 units of penicillin and 200 micrograms of streptomycin per milliliter. The resulting suspension was inoculated in amounts of 1 milliliter into sterile tubes and incubated for 24 to 48 hours at 35° C. A similar procedure was also used to produce larger batches by introducing 60 to 70 milliliters of the suspension into Blake or Roux culture flasks.

Following the initial incubation period for the chick embryo tissue cells, the growth medium was removed therefrom, the cells washed twice with medium #199 of Morgan and Parker (Morgan et al., Proceedings of the Society of Experimental Biology and Medicine, 1950, 73, pp. 1–8) and thereafter, 2 milliliters of medium #199, without serum and adjusted to a pH of 7–7.2, was added to each tube or 100 milliliters of said medium to each flask. Each tube was then inoculated with 0.2 milliliter of active live measles virus suspension or each flask with 1 milliliter of such virus suspension and the resulting cultures incubated at a temperature of 32° to 28° C. for a period of time to accomplish multiplication of the virus. In general, growth of the virus was evidenced by the fact that the cells in the tissue culture exhibited a cytopathogenic effect, and serial passage of the virus to new tissue culture medium was usually carried out when from about 25 to 50 percent of the cells in the inoculated culture exhibited the cytopathogenic effect. Alternatively, the growth of the virus in the tissue culture can be followed by titrating the culture medium in a culture of human tissue cells, such as human amnion, human heart or other suitable tissues by the method set forth in Schwarz and Zirbel, Proceedings of the Society for Experimental Biology and Medicine, 1959, vol. 102, pp. 711–714.

After sufficient passages as set forth above to accomplish the desired attentuation of the virus, one or a few additional passages in chick-embryo tissue culture were carried out at 32° C.–28° C. on a large enough scale to multiply the virus sufficiently to provide a stock of vaccine concentrate. The vaccine concentrate was harvested in conventional fashion by decantation, freezing and thawing, and washing. The pooled vaccine was clarified by centrifuging the culture liquid and washings until free of tissue cells and cell debris.

EXAMPLE 2

Preparation and Testing of Vaccine

In the preparation of a vaccine in accordance with the preferred embodiment of the invention, the Edmonston strain of measles virus, as described by Enders et al., supra, was maintained by serial passage in chick-embryo tissue culture with incubation at 35° C. for 19 successive passages. Thereafter, this chick-embryo adapted virus was passed serially by the technique of Example 1 for 37 successive passages in chick-embryo tissue culture with incubation at 32° C. The resulting attenuated virus from the 37th passage was passed through three terminal dilution chick-embryo tissue culture passages, followed by two further passages in such tissue culture to multiply the virus and produce a vaccine pool. In each of these latter passages, the culture was incubated at 32° C. The resulting vaccine concentrates were separated from tissue cells and debris and diluted with an equal volume of lactose-glutamate solution as a stabilizer. The lactose-glutamate stabilizer solution had the following composition:

| | Grams |
|---|---|
| Potassium glutamate | 0.956 |
| $Na_2HPO_4$ | 1.25 |
| $KH_2PO_4$ | 0.52 |
| Lactose | 100 |

Water to make 1 liter.

A portion of the finished vaccine was titrated against human heart tissue cells. The vaccines were found to contain from $10^{3.5}$ to $10^{4.3}$ tissue culture infective doses 50 percent ($TCID_{50}$) per 0.2 milliliter. Each vaccine pool was tested by inoculation into thioglycolate bacterial nutrient medium, by intraperitoneal and subcutaeous inoculation into guinea pigs and mice and by intramuscular and intracerebral inoculation of cynomolgous monkeys, and found to be free of contamination. Nine children, who were not immune to measles, were injected with 0.2 milliliter doses of the vaccine, two intramuscularly and 7 subcutaneously. None of the inoculated children developed measles rash and only one showed a significant rise in temperature, which was only temporary, during the observation period after vaccination.

EXAMPLE 3

Serial passages of the virus from the 37th low temperature passage of Example 2 were continued, as in Example 2, for a total of 65 passages at the 32° C. incubation temperature. Vaccine pools with lactose-glutamate stabilizer were prepared as before and freeze-dried. The reconstituted vaccine from this freeze-dried material had a titer of from $10^{2.6}$ to $10^{4.5}$ $TCID_{50}$ per 0.2 milliliter. A portion of the vaccine was also preserved by direct freezing. The vaccine was tested for safety as in Example 2.

Seventy children, who had been tested for measles complement-fixing and neutralizing antibodies and who showed no such antibodies at a 1:2 serum dilution, were inoculated subcutaneously with 0.2 milliliter of the above-described vaccine and thereafter, observed for a period of several weeks by trained medical personnel. No local or immediate reactions were observed in any of the children, except for one mild urticarial reaction occurring approximately 4 hours after vaccination. Temperatures were taken at least once daily, and in most of the children twice daily, during the period of study. In some cases, a mild, febrile response lasting about two days could be noted 7 to 8 days after vaccination. The mean maximum rectal temperature for all vaccinated children was 100.7° F. A mild measles-like rash was observed in only two children on the 11th and 13th day post vaccination, respectively. No serious complications of any type occurred during the tests and no evidence of central nervous system involvement was found. Three to six weeks after vaccination, a blood serum sample was obtained from each child and tested for measles complement-fixing and neutralizing antibodies. 97.1 percent of the children had developed antibody levels comparable to those resulting from natural measles infection.

EXAMPLE 4

Following the procedure of Example 2, measles virus from the 37th passage at 32° C. of said example was carried through ten additional passages with incubation at 32° C. followed by 15 passages with incubation at 28° C. Vaccines prepared from the 15th passage at 28° C. were employed for the inoculation of non-immune children. Thereafter, observation and tests of the inoculated children indicated that the virus had been attenuated as regards severity of reaction thereto with no determinable loss of antigenicity.

In similar fashion, the measles virus may be attenuated by culturing on isolated tissue at a temperature of about 28° to about 32° C., employing tissue such as bovine kidney tissue. In the preparation of the tissue cultures, other suitable proteolytic enzymes can be used instead of trypsin for dispersing the tissue cells. Also, other culture fluids such as Eagle's basic medium, medium #199 with 5 to 10 percent inactivated horse serum, or a medium consisting of 8 parts of Earle's basic salt solution, 1 part of 5 percent lactalbumin hydrolysate and 1 part of inactivated horse or lamb serum may be employed.

I claim:
1. A method for preparing an attenuated live virus suitable for immunizing humans against measles which comprises the steps of introducing a live measles virus, which has been adapted to grow in avian embryo tissue cell culture but which is itself incapable of immunizing humans without producing a high proportion of relatively severe undesirable reactions, into tissue cultures of avian embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of avian embryo tissue, and repeating such culture passage of the virus serially with incubation at temperatures of from about 28° C. to about 32° C. for a sufficient number of passages to produce a virus attenuated as regards severity of human reaction thereto without loss of antigenicity for producing measles antibodies.

2. A method for preparing an attenuated live virus suitable for immunizing humans against measles which comprises the steps of introducing a live measles virus, which has been adapted to grow in chick-embryo tissue cell culture but which is itself incapable of immunizing humans without producing a high proportion of relatively severe undesirable reactions, into tissue cultures of chick-embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of chick-embryo tissue, and repeating such culture passage of the virus serially with incubation at temperatures of from about 28° C. to about 32° C. for a sufficient number of passages to produce a virus attenuated as regards severity of human reaction thereto without loss of antigenicity for producing measles antibodies.

3. A method for preparing an attenuated live virus suitable for immunizing humans against measles which comprises the steps of introducing a live measles virus, which has been adapted to grow in chick-embryo tissue cell culture but which is itself incapable of immunizing humans without producing a high proportion of relatively severe undesirable reactions into tissue cultures of chick-embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of chick-embryo tissue, and repeating such culture passage of the virus serially with incubation at temperatures of from about 28° C. to about 32° C. for a total of at least about 40 passages to produce a virus attenuated as regards severity of human reaction thereto without loss of antigenicity for producing measles antibodies.

4. A method for preparing an attenuated live virus vaccine for immunizing humans against measles which comprises the steps of introducing a live measles virus, which has been adapted to grow in chick-embryo tissue cell culture but which is itself incapable of immunizing humans without producing a high proportion of relatively severe undesirable reactions, into tissue cultures of chick-embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of chick-embryo tissue, repeating such culture passage of the virus serially with incubation at temperatures of from about 28° C. to about 32° C. for a sufficient number of passages to produce a virus attenuated as regards severity of human reaction thereto without loss of antigenicity for producing measles antibodies, continuing the incubation in the final passage until there has been sufficient growth of the virus to produce a useful concentration thereof and harvesting a vaccine material containing the resulting attenuated virus in relatively high concentration.

5. A method for preparing an attenuated live virus vaccine for immunizing humans against measles which comprises the steps of introducing a live measles virus, which has been adapted to grow in chick-embryo tissue cell culture but which is itself incapable of immunizing humans without producing a high proportion of relatively severe undesirable reactions, into tissue cultures of chick-embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of the chick-embryo tissue, repeating such culture passage of the virus serially with incubation at temperatures of from about 28° C. to about 32° C. for a sufficient number of passages to produce a virus attenuated as regards severity of human reaction thereto without loss of antigenicity for producing measles antibodies, continuing the incubation in the final passage until there has been sufficient growth of the virus to produce a useful concentration thereof, harvesting a vaccine material containing the resulting attenuated virus in relatively high concentration, incorporating a stabilizer in said vaccine material and freeze-drying the resulting product.

6. A vaccine product produced by the method which comprises the steps of introducing a live measles virus, which has been adapted to grow in chick-embryo tissue cell culture but which is itself incapable of immunizing humans without producing a high proportion of relatively severe undesirable reactions, into tissue cultures of chick-embryo tissues in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of chick-embryo tissue, repeating such culture passage of the virus serially with incubation at temperatures of from about 28° C. to about 32° C. for a sufficient number of passages to produce a virus attenuated as regards severity of human reaction thereto without loss of antigenicity for producing measles antibodies, continuing the incubation in the final passage until there has been sufficient growth of the virus to produce a useful concentration thereof, harvesting a vaccine material containing the resulting attenuated virus in relatively high concentration, incorporating a stabilizer in said vaccine material and freeze-drying the resulting product.

7. A method for preparing an attenuated live virus suitable for immunizing humans against measles which comprises the steps of introducing a live measles virus, which has been adapted to grow in avian embryo tissue cell culture and which has been modified by at least about 15 passages in avian embryo tissue culture at temperatures of 35° to 37° C. and thereafter passed serially in avian embryo tissue culture with incubation at temperatures of from about 28° C. to about 32° C. for a sufficient number of passages to produce a virus attenuated as regards severity of human reaction thereto without loss of antigenicity for producing measles antibodies, into an avian embryo tissue culture in a nutrient fluid which will support avian embryo tissue growth and which is non-toxic to said virus, incubating said culture at a temperature of from about 28° C. to about 32° C. and allowing the virus to grow therein for a period until there has been sufficient growth of the said attenuated virus to produce a useful concentration thereof, and then harvesting therefrom a material containing the virus in relatively high concentration to produce an attenuated live measles virus vaccine.

8. A method for preparing an attenuated live virus vaccine for immunizing humans against measles which comprises the steps of introducing live measles virus of the Edmonston strain, which has been adapted to grow in chick embryo tissue cell culture but which is itself incapable of immunizing humans without producing a high proportion of relatively severe, undesirable reactions, into tissue cultures of chick embryo tissue in a nutrient fluid capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of chick embryo tissue, repeating such culture passage of the virus serially with incubation at temperatures of from about 28° C. to about 32° C. for a number of passages, at least about 40, sufficient to produce a virus attenuated as regards severity of human reaction thereto without loss of antigenicity for producing measles antibodies, continuing the incubation in the final passage until there has been sufficient growth of the virus to produce a useful concentration thereof and harvesting a vaccine material containing the resulting attenuated virus in relatively high concentration.

9. A method for preparing an attenuated live virus vaccine for immunizing humans against measles which comprises the steps of introducing live measles virus, which has been obtained by adapting the Edmonston strain of measles virus to grow in chick embryo tissue cell culture by serial passage in such cultures and thereafter further attenuating said virus by at least about 40 serial passages in chick embryo tissue culture with incubation at temperatures of from about 28° C. to about 32° C., into cultures of chick embryo tissue in a nutrient fluid capable of supporting said tissue growth and which is non-toxic to said virus, incubating said tissue-containing nutrient fluid at a temperature of from about 28° C. to about 32° C. for a period of time to foster growth of said virus and until there has been sufficient growth of the virus to produce a useful concentration thereof and harvesting a vaccine material containing the resulting attenuated virus in relatively high concentration.

10. A method for preparing an attenuated live virus suitable for immunizing humans against measles which comprises the steps of introducing a live measles virus, which has been adapted to grow in tissue cell culture but which is itself incapable of immunizing humans without producing a high proportion of relatively severe undesirable reaction, into non-human mammalian kidney tissue cultures in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of the selected tissue, and repeating such culture passage of the virus serially with incubation at temperatures of from about 28° C. to about 32° C. for a sufficient number of passages to produce a virus attenuated as regards severity of human reaction thereto without loss of antigenicity for producing measles antibodies.

11. A vaccine product produced by the method which comprises the steps of introducing a live measles virus, which has been adapted to grow in tissue cell culture but which is itself incapable of immunizing humans without producing a high proportion of relatively severe undesirable reaction, into non-human mammalian kidney tissue cultures in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of the selected tissue, repeating such culture passage of the virus serially wth incubation at temperatures of from about 28° C. to about 32° C. for a sufficient number of passages to produce a virus attenuated as regards severity of human reaction thereto without loss of antigenicity for producing measles antibodies, continuing the incubation in the final passage until there has been sufficient growth of the virus to produce a useful concentration thereof and harvesting a vaccine material containing the resulting attenuated virus in relatively high concentration.

12. A method for preparing an attenuated live virus vaccine for immunizing humans against measles which comprises the steps of introducing a live measles virus, which has been adapted to grow in tissue cell culture but which is itself incapable of immunizing humans without producing a high proportion of relatively severe undesirable reactions, into non-human mammalian kidney tissue cultures in a nutrient fluid, capable of supporting said tissue growth and which is non-toxic to said virus, incubating said tissue-containing nutrient fluid at a temperature of from about 28° C. to about 32° C. for a period of time to foster growth of said virus, harvesting at least a portion of the virus so produced and reintroducing such harvested virus into fresh cultures of the selected tissue, repeating such culture passage of the virus serially with incubation at temperatures of from about 28° C. to about 32° C. for a sufficient number of passages to produce a virus attenuated as regards severity of human reaction thereto without loss of antigenicity for producing measles antibodies, continuing the incubation in the final passage until there has been sufficient growth of the virus to produce a useful concentration thereof, harvesting a vaccine material containing the resulting attenuated virus in relatively high concentration, incorporating a stabilizer in said vaccine material and freeze-drying the resulting product.

References Cited in the file of this patent

UNITED STATES PATENTS

| | | |
|---|---|---|
| 2,912,361 | Froelich | Nov. 10, 1959 |
| 2,990,335 | Earle et al. | June 27, 1961 |

OTHER REFERENCES

"Experimental Vaccination Against Measles, I—II", J.A.M.A. 173, pp. 861–872, June 25, 1960:

I. Tests of live measles and distemper vaccine in monkeys and two human volunteers under laboratory conditions, ibid, pp. 861–867, Schwarz et al.

II. Tests of live measles and live distemper vaccine in human volunteers during a measles epidemic in Panama, ibid, pp. 868–872, Hoekenga et al.

Moscona: "Rotation-Mediated Histogenic Aggregation of Dissociated Cells," Experimental Cell Research, vol. 22, pp. 455–475, 1961.

Burnet: "Immunological Recognition of Self," Science, vol. 133, No. 3449, pp. 307–311, Feb. 3, 1961.

Chany et al.: "Culture Des Cellules in Vitro A La Temperature Centrale Des Animaux Homeo-Thermes et Dans Les Zones Hyperthermiques," Comptes Rendus, Acad. Sci. (Par), 253, 579–581, July 1961.

Chany et al.: "Homeothermic Cell Culture in Vitro," pp. 319–324, Am. J. Diseases Children, vol. 103, No. 3, Mar. 1962, Reporting "International Conference on Measles Immunization," N.I.H., Bethesda, Maryland, Nov. 7, 1961.

Schwarz: "Preliminary Tests of a Highly Attenuated Measles Vaccine," pp. 386–389, 392, 394, Am. J. Diseases Children, vol. 103, No. 3, Mar. 1962, Reporting "International Conference on Measles Immunization," N.I.H., Bethesda, Maryland, Nov. 7, 1961.

Black: "Growth and Stability of Measles Virus," Virology, vol. 1, pp. 184–192, 1959.

Black et al.: "Measles Virus," Advances in Virus Research, vol. 6, pp. 205–227, 1959.

Warren: "The Relationships of the Viruses of Measles, Canine Distemper, and Rinderpest," Advances in Virus Research, vol. 7, pp. 27–60 (1960).

Weiss: "Guiding Principles in Cell Locomotion and Cell Aggregation," Experimental Cell Research, Supp. 8, pp. 260–281, 1961.